3,078,307
TRIFLUOROMETHYLPHENYLALKYLAMINE
DERIVATIVES
Paul N. Craig, Roslyn, Pa., and Charles L. Zirkle, Haddon Heights, N.J., assignors to Smith Kline & French Laboratories, Philadelphia, Pa., a corporation of Pennsylvania
No Drawing. Filed Apr. 22, 1959, Ser. No. 808,023
5 Claims. (Cl. 260—570.8)

This invention relates to novel trifluoromethylphenylalkylamine derivatives which are therapeutically active compounds and a method for their preparation.

The new compounds of this invention have utility as pharmacodynamically active agents, more specifically, as anorexigenic agents. These phenylalkylamines are particularly advantageous for inducing anorexia because the typical sympathomimetic side effects, such as jitteriness, excessive stimulation or increased tension, are markedly diminished or entirely eliminated. The novel trifluoromethylphenylalkylamines of this invention do not show signs of stimulation or such side effects until the dose is well above the anorexigenic dose range. This is indeed a tremendous advantage over anorexigenic agents which display stimulation and other bothersome side effects in the anorexigenic dose range.

The trifluoromethylphenylalkylamines of this invention are represented by the general formula:

FORMULA I

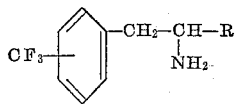

when: R represents hydrogen or methyl.

Preferable compounds of this invention are represented by the following formula:

FORMULA II

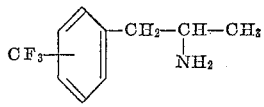

The most advantageous compound of this invention is 1-(p-trifluoromethylphenyl)-2-aminopropane.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The novel trifluoromethylphenylalkylamines of this invention are prepared according to the following synthetic procedure in which R is given above and $R_2$ is hydrogen or methyl.

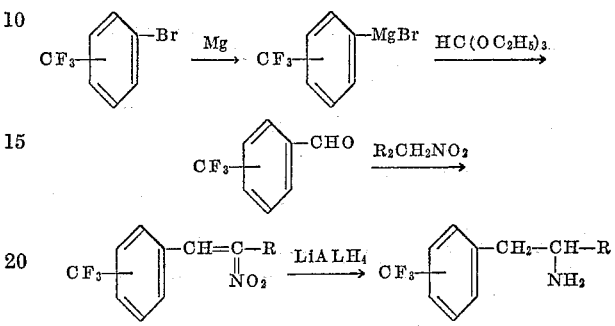

This general procedure is used to prepare the trifluoromethylphenylalkylamines of this invention utilizing readily available starting materials and gives excellent yields of the end product. By way of example, the preparation of trifluoromethylphenylpropylamines is carried out by the following procedure.

Under a nitrogen atmosphere, an anhydrous ethereal solution of the appropriately substituted bromobenzotrifluoride is slowly added to a stirred solution of dried ether containing magnesium shavings, ethyl bromide and iodine. The reaction mixture is heated at reflux and the resulting trifluoromethylphenyl magnesium bromide then treated with an ethereal solution of triethyl orthoformate. The product is trifluoromethylbenzaldehyde. The trifluoromethylbenzaldehyde is then condensed with nitroethane in the presence of alcoholic sodium hydroxide or preferably in the presence of ammonium acetate and glacial acetic acid yielding trifluoromethylphenyl-2-nitropropene. Reduction of these nitro compounds is accomplished by reacting an ethereal mixture, such as for example, ethyl ether, butyl ether, or tetrahydrofuran, containing the nitro compound and a bimetallic hydride, preferably lithium aluminum hydride. Preferably a lower alkyl ether is used and the temperature range for the reaction is from about 25° C. to about the refluxing temperature of above mentioned ethereal mixtures. Most advantageously the reaction is accomplished by refluxing the ethereal mixture at a temperature range of from about 30° C. to about 150° C. The mixture is refluxed for approximately two hours and then hydrolyzed by the alternate addition of water and sodium hydroxide solution, approximately a 25% solution. The precipitate is filtered and washed with ether. The ethereal solutions are combined and evaporated to give the desired trifluoromethylphenylpropylamines.

The corresponding trifluoromethylphenylethylamines are prepared by condensing the trifluoromethylbenzaldehyde with nitromethane and proceeding as above.

It will be readily apparent to one skilled in the art that due to the presence of an asymmetric carbon atom certain of the compounds of this invention may be present as optical isomers. The connotation of the general formulae presented herein is to include all isomers, particularly the separated $d$ or $l$ optical isomers as the $dl$ mixture of these isomers. If desired, the isomers may be separated for individual use by separation methods known to the art, such as fractional crystallization, for instance, of the $d$-tartrate salts of the trifluoromethylphenylalkylamine derivatives.

It will also be readily apparent to one skilled in the art that variations of these procedures are possible. The preferable preparative procedures are the methods discussed above, namely, conversion of the bromobenzotrifluoride to the trifluoromethylbenzaldehyde by way of Grignard reaction, condensation of the aldehyde with the alkyl nitro derivative and finally reduction to the final trifluoromethylphenylalkylamine.

The trifluoromethylphenylalkylamine derivatives of this invention are preferably employed in pharmaceutical form. If a solid carrier is used, the preparation is tableted, placed in a hard gelatin capsule or in the form of a troche or lozenge. The amount of solid carrier will vary widely but preferably is from about 25 mg. to about 1 gm. If a liquid carrier is used the preparation is in the form of a soft gelatin capsule, placed in an ampule or in a liquid suspension.

Regardless of the pharmaceutical form chosen, a dosage unit of the preparation in accordance with this invention is comprised of from about 5 mg. to about 50 mg. and preferably from about 10 mg. to about 30 mg. of a trifluoromethylphenylalkylamine derivative or a nontoxic acid addition salt thereof.

The following examples are not limiting but are illustrative of compounds of this invention and the procedures for their preparation.

*Example 1*

Under a nitrogen atmosphere, a stirred solution consisting of 9.9 g. of magnesium shavings, one ml. of ethyl bromide, a crystal of iodine and 10 ml. of dry ether is slowly treated with a solution consisting of 83.5 g. of p-bromobenzotrifluoride in 300 ml. of anhydrous ether. The reaction starts immediately and addition is continued for 2½ hours. The dark brown reaction mixture is refluxed for 2 hours after completion of addition. A solution of 66 g. of triethyl orthoformate in 90 ml. of anhydrous ether is added during a ten minute period and the reaction mixture is again refluxed for 18 additional hours. At the end of the reflux period, the ether is evaporated under reduced pressure and a mixture of 150 g. of crushed ice and 375 ml. of cold 6 N hydrochloric acid is added to the residue. The mixture is refluxed under nitrogen for 2 hours and the resulting dense red oil steam distilled. The distillate is extracted with ether, the ether solution is dried over anhydrous magnesium sulfate and the solvent removed under reduced pressure. The residue is distilled and yields p-trifluoromethylbenzaldehyde as a colorless oil.

A solution consisting of 23.3 g. of p-trifluoromethylbenzaldehyde, 9.0 g. of ammonium acetate, 15.3 g. of nitroethane and 90 ml. of glacial acetic acid is refluxed for 2 hours and allowed to stand at room temperature for 72 hours. The addition of 600 ml. of cold water causes a deep orange oil to separate. This oil is mixed with 25 ml. of ethanol and cooled in a Dry Ice-acetone bath. The yellow solid which separates is filtered while the mixture is still cold. Recrystallization from absolute ethanol gives 1-(p-trifluoromethylphenyl)-2-nitropropene as yellow crystals with a melting point of 38–39° C.

A solution of 19 g. of 1-(p-trifluoromethylphenyl)-2-nitropropene in 210 ml. of anhydrous ether is added with reflux to a solution of 10.8 g. of lithium aluminum hydride in 500 ml. of dry ether. Upon complete addition the reaction mixture is refluxed for two hours. The mixture is hydrolyzed by the addition of 12 ml. of water followed by 9 ml. of 20% sodium hydroxide and finally by 50 ml. of water. The white granular precipitate is filtered and washed with ether. The ether washings are combined and hydrogen chloride gas is bubbled into the ethereal solution until white salt no longer precipitates. The white crystalline 1-(p-trifluoromethylphenyl)-2-aminopropane hydrochloride is filtered and recrystallized from methanol and ether. The melting point of the final product is 195–197° C.

*Example 2*

Eighty-five grams of p-trifluoromethylbenzaldehyde (as prepared in Example 1) is dissolved in two liters of 95% ethanol and cooled to 5° C. To this solution is added 30.4 g. of nitromethane and 5% alcoholic sodium hydroxide cooled to 5° C. at a rate of 5 cc. per minute with stirring and maintaining the temperature at 5° C. during the addition. Upon complete addition, 2 liters of ice water are added resulting in the dissolution of the sodium salt precipitate. The clear solution is added, in a fine stream, to a mixture of 600 cc. of concentrated hydrochloric acid and 1.8 liters of water. The p-trifluoromethyl-β-nitrostyrene is filtered and recrystallized from ethanol.

Twenty-six grams of p-trifluoromethyl-β-nitrostyrene are dissolved in dry ether and added with reflux to a solution of 14.9 g. of lithium aluminum hydride dissolved in 500 ml. of dry ether. Upon complete addition the reaction mixture is refluxed for two-and-a-half hours. The mixture is hydrolyzed by the addition of 14.6 ml. of water followed by 11 ml. of 20% sodium hydroxide and finally by 52.0 ml. of water. The precipitate is filtered and washed with ether. The ether washings are combined. Evaporation of the solvent in vacuo yields p-trifluoromethylphenylethylamine.

Treating a solution of the free base in ethyl acetate with tartaric acid gives the corresponding tartrate salt.

*Example 3*

A stirred solution consisting of 4.95 g. of magnesium shavings, one ml. of ethyl bromide, a crystal of iodine and 7 ml. of dry ether is slowly treated with a solution consisting of 41.75 g. of m-bromobenzotrifluoride in 200 ml. of anhydrous ether. The reaction starts immediately and addition is continued for 2 hours. The reaction mixture is refluxed for 1½ hours after completion of addition. A solution of 33 g. of triethyl orthoformate in 50 ml. of dry ether is added during a seven minute period and the reaction mixture is again refluxed for 15 additional hours. Upon completion of refluxing, the ether is evaporated under reduced pressure and a mixture of crushed ice and 187 ml. of cold 5 N hydrochloric acid is added to the residue. The mixture is then refluxed under nitrogen for 2 hours and the resulting oil steam distilled. The distillate is extracted with ether, the ethereal solution dried over anhydrous magnesium sulfate and the solvent removed under pressure. Upon distillation the residue yields m-trifluoromethylbenzaldehyde as a colorless oil.

A solution consisting of 11.6 g. of m-trifluoromethylbenzaldehyde, 4.5 g. of ammonium acetate, 7.6 g. of nitroethane and 45 ml. of glacial acetic acid is refluxed for 1½ hours and allowed to stand at room temperature for 56 hours. The addition of 300 ml. of cold water causes a deep orange oil to separate, which is extracted by ether. Evaporation of the ether gives 1-(m-trifluoromethylphenyl)-2-nitropropene.

A solution of 9.5 g. of dry 1-(m-trifluoromethylphenyl)-2-nitropropene in 105 ml. of anhydrous ether is added with reflux to a solution of 5.4 g. of lithium aluminum hydride in 250 ml. of dry ether. Upon complete addition the reaction mixture is refluxed for two hours. The mixture is hydrolyzed by the addition of 6 ml. of water followed by 4.5 ml. of 20% sodium hydroxide solution and finally by 25 ml. of water. The precipitate is filtered and washed with ether. The ether washings are combined and treated with an excess of hydrogen bromide to yield 1-(m-trifluoromethylphenyl)-2-aminopropane hydrobromide.

*Example 4*

A solution consisting of 2.5 g. of magnesium shavings, 1 ml. of ethyl bromide, a crystal of iodine and 5 ml. of dry ether is stirred under a nitrogen atmosphere and slowly treated with a solution consisting of 20.8 g. of o-bromobenzotrifluoride in 100 ml. of anhydrous ether. The reaction starts immediately and addition is continued for 2 hours. The reaction mixture is refluxed for 2 hours after completion of addition. A solution of 16.5 g. of triethyl orthoformate in 22.5 ml. of anhydrous ether is added during a five minute period and the reaction mixture is again refluxed for 15 additional hours. At the end of the reflux period, the ether is evaporated under reduced pressure and a mixture of 45 g. of crushed ice and 95 ml. of cold 6 N hydrochloric acid is added to the residue. The mixture is refluxed under nitrogen for 1½ hours and the resulting dense oil is steam distilled. The distillate is extracted with ether, the ether solution is dried over anhydrous magnesium sulfate and the solvent removed under reduced pressure. The residue is distilled and yields o-trifluoromethylbenzaldehyde as an oil.

To a solution of 8.5 g. of o-trifluoromethylbenzaldehyde in 200 ml. of 95% ethanol which has been cooled to 5° C. is aded 3.0 g. of nitromethane and 5% alcoholic sodium hydroxide cooled to 5° C. at a rate of 5 cc. per minute with stirring and maintaining the temperature at 5° C. during the addition. Upon complete addition, 200 ml. of ice water are added resulting in the dissolution of the sodium salt precipitate. The clear solution is added in a fine stream to a mixture of 60 ml. of concentrated hydrochloric acid and 180 ml. of water. The o-trifluoromethyl-$\beta$-nitrostyrene is extracted from the mixture with ether, and is obtained upon evaporation of the ether solution.

A solution of 2.6 g. of o-trifluoromethyl-$\beta$ nitrostyrene in dry ether is added with reflux to a solution of 1.49 g. of lithium aluminum hydride dissolved in 50 ml. of dry ether. Upon complete addition the reaction mixture is refluxed for two hours. This mixture is hydrolyzed by the addition of 3 ml. of water followed by the addition of 1.5 ml. of 20% sodium hydroxide and finally by 5.2 ml. of water. The precipitate is filtered and washed with ether. The ether washings are combined and evaporated in vacuo to yield o-trifluoromethylphenylethylamine.

A solution of the free base in ethyl acetate is treated with glacial acetic acid to give the acetate salt.

What is claimed is:

1. A chemical compound selected from the group consisting of the free base having the structural formula:

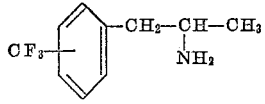

and addition salts thereof with non-toxic, pharmaceutically-acceptable acids.

2. A chemical compound having the structural formula:

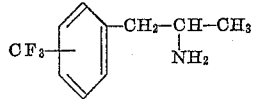

3. 1-(p-trifluoromethylphenyl)-2-aminopropane.
4. 1-(p-trifluoromethylphenyl)-2-aminopropane hydrochloride.
5. A chemical compound selected from the group consisting of 1-(m-trifluoromethylphenyl)-2-aminopropane and addition salts thereof with non-toxic, pharmaceutically-acceptable acids.

References Cited in the file of this patent
UNITED STATES PATENTS

| | | |
|---|---|---|
| 2,233,823 | Susie et al. | Mar. 4, 1941 |
| 2,636,901 | Tindall | Apr. 28, 1953 |
| 2,748,052 | Rosner | May 29, 1956 |

FOREIGN PATENTS

| | | |
|---|---|---|
| 360,266 | Great Britain | Nov. 5, 1931 |

OTHER REFERENCES

Freed et al.: Chem. Abstracts, volume 46, page 9210 (1952).

Chiavarelli: Chem. Abstracts, volume 47, page 4855e (1953).

Onda et al.: Jour. Pharm. Soc. Japan, volume 76 #4, pages 472 to 473 (1956).